(12) United States Patent
Lafitte et al.

(10) Patent No.: US 10,865,645 B2
(45) Date of Patent: Dec. 15, 2020

(54) METHOD FOR MANUFACTURING A TURBOMACHINE FAN HAVING A REDUCED NOISE LEVEL AT MULTIPLE ROTATIONAL FREQUENCIES OF SAID TURBOMACHINE

(71) Applicant: Safran Aircraft Engines, Paris (FR)

(72) Inventors: Anthony Bernard Germain Lafitte, Moissy-Cramayel (FR); Jean-Frederic Pierre Joseph Bruhat, Moissy-Cramayel (FR); Frederic Jean-Bernard Pouzadoux, Moissy-Cramayel (FR); Jean-Michel Roux, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 59 days.

(21) Appl. No.: 15/580,243

(22) PCT Filed: Jun. 8, 2016

(86) PCT No.: PCT/FR2016/051377
§ 371 (c)(1),
(2) Date: Dec. 6, 2017

(87) PCT Pub. No.: WO2016/198790
PCT Pub. Date: Dec. 15, 2016

(65) Prior Publication Data
US 2018/0171803 A1     Jun. 21, 2018

(30) Foreign Application Priority Data

Jun. 8, 2015 (FR) .................. 15 55209

(51) Int. Cl.
*F01D 5/02* (2006.01)
*F01D 5/14* (2006.01)
(Continued)

(52) U.S. Cl.
CPC .............. *F01D 5/027* (2013.01); *F01D 5/141* (2013.01); *F01D 5/16* (2013.01); *F01D 5/282* (2013.01);
(Continued)

(58) Field of Classification Search
CPC .. F04D 15/0088; F04D 27/001; F04D 29/324; F04D 29/327; F04D 29/644;
(Continued)

(56) References Cited

U.S. PATENT DOCUMENTS

| | | | |
|---|---|---|---|
| 4,732,532 A | 3/1988 | Schwaller et al. | |
| 2006/0010686 A1 | 1/2006 | Henning et al. | |

(Continued)

FOREIGN PATENT DOCUMENTS

| | | |
|---|---|---|
| EP | 1382858 A1 | 1/2004 |
| EP | 1679426 A2 | 7/2006 |
| EP | 2400114 A1 | 12/2011 |

OTHER PUBLICATIONS

Preliminary Research Report received for French Application No. 1555209, dated Apr. 1, 2016, 3 pages (1 page of French Translation Cover Sheet and 2 pages of original document).

(Continued)

*Primary Examiner* — Kenneth Bomberg
*Assistant Examiner* — Julian B Getachew
(74) *Attorney, Agent, or Firm* — Womble Bond Dickinson (US) LLP

(57) ABSTRACT

The invention relates to a method (100) for manufacturing a turbomachine fan comprising a plurality of blades mounted on a disc extending along a longitudinal axis, said method comprising the following steps of: —measuring (102) at least one structural parameter of each of the blades in the cold state, and, for each of the blades, estimating (103) at least one structural parameter in operation relating to a blade (Continued)

from the structural parameter(s) measured on said blade in the cold state, —determining (104) an optimal sequence of the blades around the disc from the structural parameters estimated in operation for each of the blades, and —mounting (105) the blades on the disc in the optimal sequence thus determined.

9 Claims, 7 Drawing Sheets

(51) Int. Cl.
  *F01D 5/16* (2006.01)
  *F04D 29/32* (2006.01)
  *F04D 29/66* (2006.01)
  *F04D 29/64* (2006.01)
  *F01D 5/28* (2006.01)

(52) U.S. Cl.
  CPC ......... *F04D 29/324* (2013.01); *F04D 29/327* (2013.01); *F04D 29/644* (2013.01); *F04D 29/668* (2013.01); *F04D 29/662* (2013.01); *F05D 2220/36* (2013.01); *F05D 2240/301* (2013.01); *F05D 2240/302* (2013.01); *F05D 2240/303* (2013.01); *F05D 2240/304* (2013.01); *F05D 2240/40* (2013.01); *F05D 2260/96* (2013.01); *F05D 2260/961* (2013.01); *Y02T 50/673* (2013.01)

(58) Field of Classification Search
  CPC .... F04D 29/662; F04D 29/663; F04D 29/666; F04D 29/668; F02C 7/045; F01D 5/027; F01D 5/282; F01D 5/141; F01D 5/16; F05D 2260/961; F05D 2240/301; F05D 2240/40; F05D 2240/304; F05D 2220/36; F05D 2240/302; F05D 2260/96; F05D 2240/303
  See application file for complete search history.

(56) References Cited

U.S. PATENT DOCUMENTS

| | | |
|---|---|---|
| 2006/0013692 A1 | 1/2006 | Henning et al. |
| 2006/0029493 A1 | 2/2006 | Schwaller et al. |
| 2006/0188374 A1 | 8/2006 | Mickol et al. |
| 2008/0027686 A1 | 1/2008 | Mollmann et al. |

OTHER PUBLICATIONS

International Search Report and Written Opinion received for PCT Patent Application No. PCT/FR2016/051377, dated Sep. 09, 2016, 17 pages (8 pages of English Translation and 9 pages of Original Document).

International Preliminary Report on Patentability received for PCT Patent Application No. PCT/FR2016/051377, dated Dec. 21, 2017, 13 pages (7 pages of English Translation and 6 pages of Original Document).

METHOD FOR MANUFACTURING A TURBOMACHINE FAN HAVING A REDUCED NOISE LEVEL AT MULTIPLE ROTATIONAL FREQUENCIES OF SAID TURBOMACHINE

GENERAL TECHNICAL FIELD

The present application relates to turbomachine blades, particularly turbomachine fan blades. More precisely, the present application relates to a manufacturing method of a turbomachine fan having a reduced noise level at multiple rotational frequencies of said fan.

PRIOR ART

A turbomachine generally comprises, from upstream to downstream, in the gas flow direction, a fan, one or more compressor states, for example a low-pressure compressor and a high-pressure compressor, a combustion chamber, one or more turbine stages, for example a high-pressure turbine and a low-pressure turbine, and a gas exhaust nozzle. Such a turbomachine generally equips an aircraft.

Conventionally, the fan is driven and supported by a rotating shaft which is connected to a disk accommodating a plurality of blades.

During takeoff phases of the aircraft, the fan of a turbomachine operates generally in the transonic regime. In other words, the relative speed of the fan is subsonic at the blade root and supersonic at the blade tip. Shock waves then form on a portion of the span of said blades and radiate upstream of the fan, in the air intake duct of the turbomachine.

FIG. 1a illustrates the propagation of shocks in the air intake duct in the case of a "perfect" fan 1 comprising a number N of blades 2. In FIG. 1a, the arrow F1 corresponds to the direction of rotation of the fan 1, and the arrow F2 the direction of propagation of the shocks generated by the fan 1. It will be noted in this figure that, in the case of a perfect fan 1, the propagation of shocks has a $2\pi/N$ periodicity.

FIG. 1b illustrates the acoustic spectrum of the perfect fan 1, measured upstream of said fan 1 in the near field, for example at the fuselage of the aircraft near the fan 1. The spectrum causes the appearance of a strong tonal noise at so-called BPF frequencies (blade passing frequency). These BPF are equal to N*R, where R corresponds to the engine speed of the turbomachine.

In reality, the amplitude of the pressure peaks generated on the span of the blades is so high that the propagation of the shocks in the air intake duct is nonlinear, which makes the propagation very sensitive to the least perturbation.

However, in the case of a "real" fan 1' (FIG. 2a), the blades 2' have, at the time of their manufacture, geometric differences, which introduce a modulation of amplitude and of phase during the generation/propagation of shocks. These deviations increase during the nonlinear propagation in the intake duct until they break the $2\pi/N$ periodicity of the shocks. The rupture of the $2\pi/N$ periodicity of the shocks is illustrated in 2a, and the effect of this periodicity rupture of the shocks on the acoustic spectrum of the real fan 1' measure upstream of said fan 1' in the near field is illustrated in FIG. 2b. The spectrum causes a strong tonal noise to appear at so-called FMR (multiple rotation frequencies) frequencies of the fan 1'.

The appearance of noise at these FMR frequencies is particularly problematical. In fact, the noise emitted by the fan 1' then resembles that emitted by an electric saw and is therefore particularly annoying for the passengers located on board the aircraft. This noise can also be annoying for the residents of the takeoff/landing areas of the aircraft.

In fact, it is poorly attenuated by the acoustic treatment elements disposed in the inlet duct of the turbomachine, the latter being generally designed to attenuate noise at BPF frequencies. Moreover, the noise emitted at the lowest FMR frequencies is scarcely attenuated by the fuselage of the aircraft. In fact, the fuselage attenuates structurally certain ranges of frequencies, particularly the high frequencies and the very low frequencies. On the other hand, there exists a range of frequencies (typically around several hundred Hz) in which the attenuation generated by the fuselage is minimal.

To mitigate the appearance of noise at FMR frequencies, methods are known for determining the sequence of blades of a fan around the disk so as to minimize the noise at these FMR frequencies.

Such methods are for example described in documents U.S. Pat. No. 4,732,532, US 2006/0029493, US 2006/0010686, US 2006/0013692, US 2008/0027686 and US 2006/0188374. These methods are from the cold measurement of one or more geometric parameters (the stagger angle for example) on each of the blades intended to be mounted on the disk, then on the determination of the sequence of the blades from the cold measurements of these geometric parameters so as to limit the deviation between successive blades of these geometric parameters measured in the cold state. What is meant by "measurement in the cold state" is a measurement carried out on a blade after its manufacture but before it is mounted on the disk.

Recent tests have shown that the geometric differences from blade to blade, that is between two successive or directly adjoining blades, have an influence on the noise level at FMR frequencies. Thus, the higher the geometric disparities between two successive blades, the greater is the noise level at FMR frequencies. It will therefore be understood that the method previously described actually allow a reduction in the noise level at FMR frequencies.

However, the effect of these methods on noise at FMR frequencies remains limited. I fact, when the turbomachine is in operation, and the blades are in rotation and aerodynamically loaded, the blades can have behavior when hot, particularly unwinding and extension, but also vibrations, which differ from one blade to another. For this reason, in operation, the deviations between the geometric parameters of blades taken in succession are modified, which puts back into question the sequence determined from cold measurements of the geometric parameters of the blades.

PRESENTATION OF THE INVENTION

The present invention responds to this problem by proposing a manufacturing method of a fan of a turbomachine in which the hot behavior of the blades is taken into account to determine the sequence of the blades around the disk of the fan.

More precisely, the present invention has as its object a method for manufacturing a turbomachine fan comprising a plurality of blades mounted on a disk extending along a longitudinal axis, said method comprising the following steps of:

measuring in the cold state at least one structural parameter on each of the blades, and for each of the blades, estimating at least one structural parameter in operation relating to a blade from the structural parameter(s) measured in the cold state on said blade, determining an optimal sequence of the blades around the disk from the structural parameters estimated in operation for each of the blades, so as to reduce the noise level at multiple rotational frequencies of the fan, and mounting the blades on the disk in the optimal sequence thus determined.

Thus, the optimal sequence of the blades around the disk is determined from structural parameters of the blades estimated in operation and not only from structural parameters of the blade measured in the cold state. This makes it possible to take into account, for the determination of the optimal sequence, the behavior of the blades when the turbomachine is operating, and therefore to reduce more effectively the noise levels at multiple rotational frequencies of the fan.

Advantageously, the estimation in operation of the structural parameter(s) of a blade is performed from the structural parameter(s) measured in the cold state in said blade and from a predictive response surface previously generated by the response surface method to which are applied the structural parameter(s) measured in the cold state on the blade.

Advantageously, the structural parameter(s) measured in the cold state of the blade are selected from:
- the position of the center of gravity of a section of the blade at a given cross-sectional height of said blade, and/or
- the stagger angle of the blade at a given cross-sectional height of said blade, and/or
- the leading edge angle of the blade at a given cross-sectional height of said blade, and/or
- the trailing edge angle of the blade at a given cross-sectional height of said blade.

Advantageously, the structural parameter(s) measured in the cold state of the blade are selected from:
- the position of the center of gravity of a section of the blade at a given cross-sectional height of said blade, and/or
- the length of the chord of the blade at a given cross-sectional height of said blade, and/or
- the stagger angle of the blade at a given cross-sectional height of said blade, and/or
- the leading edge angle of the blade at a given cross-sectional height of said blade, and/or
- the trailing edge angle of the blade at a given cross-sectional height of said blade, and/or
- the total height of the blade, and/or
- the radial and/or axial and/or tangential static moment of the blade, and/or
- the mass of the blade.

Advantageously, the structural parameter(s) estimated in operation of the blade are selected from:
- the stagger angle of the blade at a given cross-sectional height of said blade, and/or
- the leading edge angle of the blade at a given cross-sectional height of said blade, and/or
- the trailing edge angle of the blade at a given cross-sectional height of said blade.

Advantageously, the structural parameter(s) estimated in operation of the blade are selected from:
- the position of the center of gravity of a section of the blade at a given cross-sectional height of said blade, and/or
- the length of the chord of the blade at a given cross-sectional height of said blade, and/or
- the stagger angle of the blade at a given cross-sectional height of said blade, and/or
- the leading edge angle of the blade at a given cross-sectional height of said blade, and/or
- the trailing edge angle of the blade at a given cross-sectional height of said blade, and/or
- the total height of the blade, and/or
- the radial and/or axial and/or tangential static moment of the blade, and/or
- the mass of the blade.

Preferably, the given cross-sectional height is taken as 90% of the total height of the blade from the root of said blade.

The present invention also has at its object a turbomachine fan capable of being obtained by the implementation of the manufacturing method as previously described.

The present invention also has at its object a turbomachine comprising a fan as previously described.

PRESENTATION OF THE FIGURES

Other features, aims and advantages of the invention will be revealed from the description that follows, which is purely illustrative and not limiting, and which must be read with reference to the appended drawings in which.

DETAILED DESCRIPTION

Figure 1A:
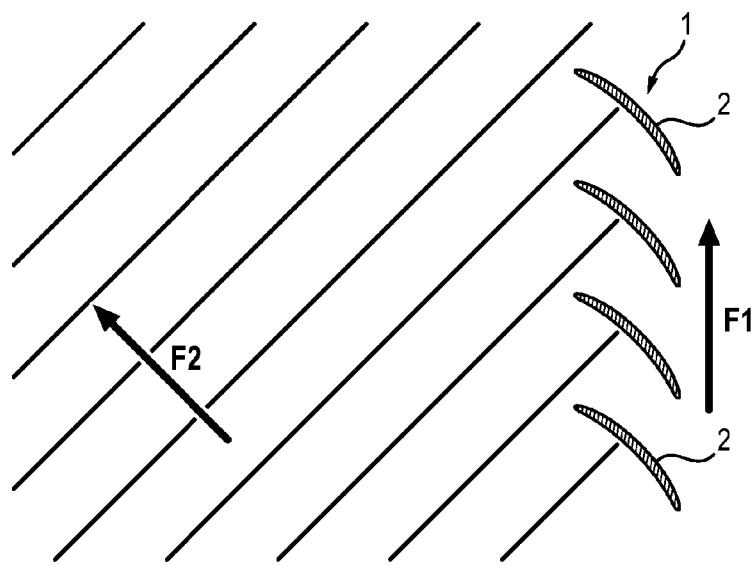
FIGS. 1a and 1b show respectively the propagation of shocks in the intake duct of a "perfect" fan, and the noise spectrum of this fan in the near field.
Figure 1B:
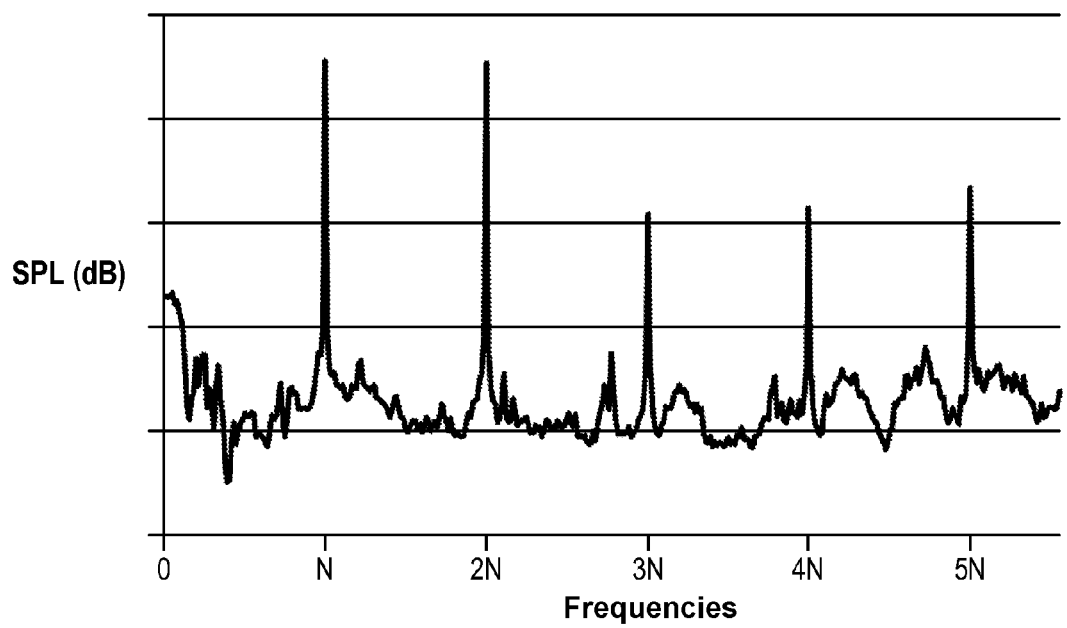
Figure 2A:
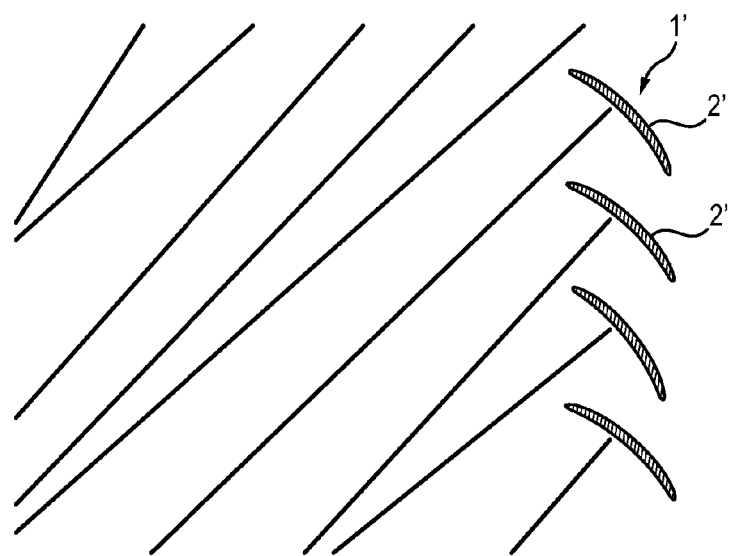
FIGS. 2a and 2b show respectively the propagation of shocks in the intake duct of a "real" fan, and the noise spectrum of this fan in the near field.
Figure 2B:
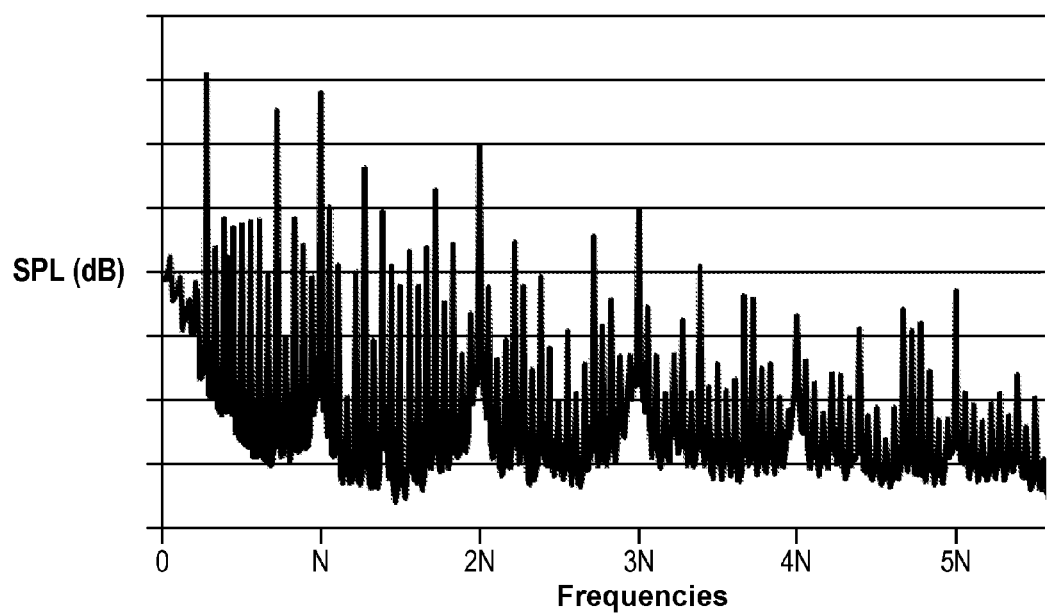
Figure 3:
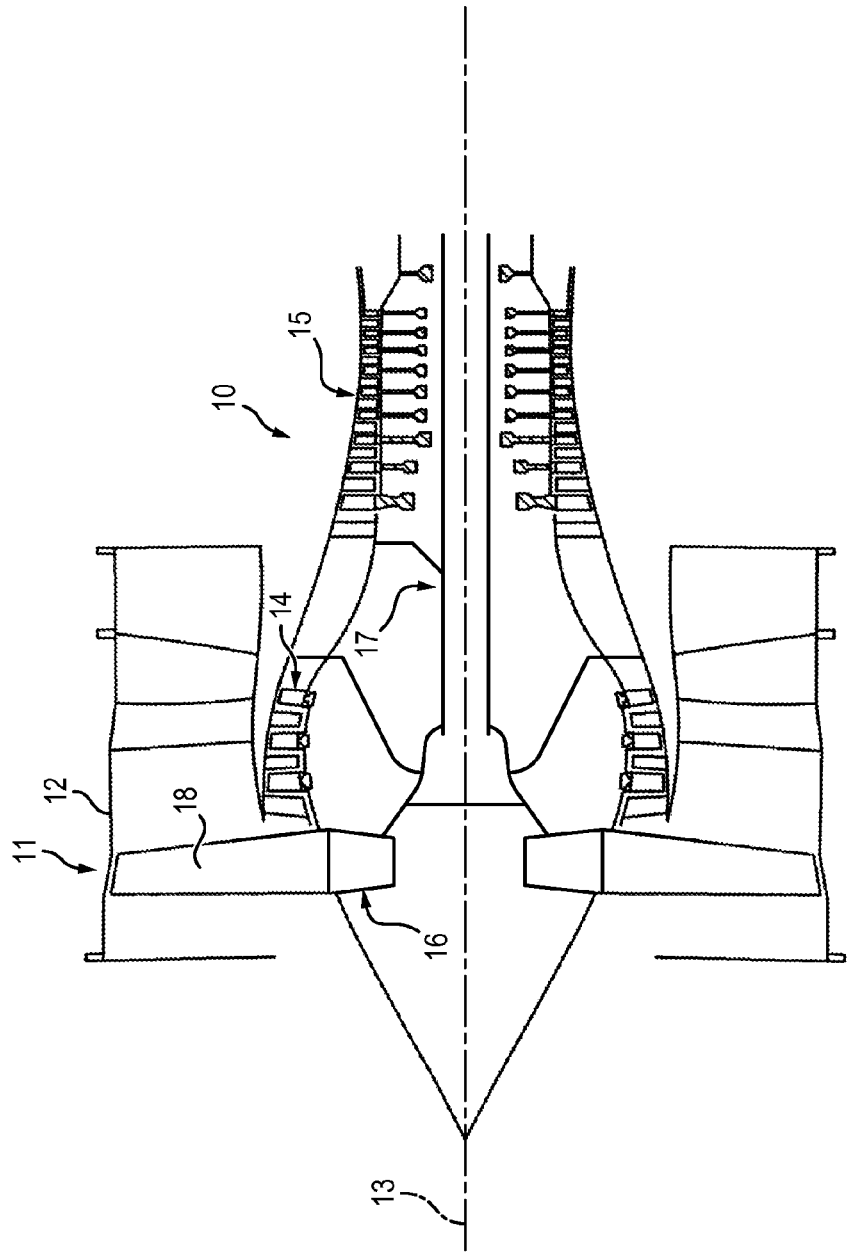
FIG. 3 shows an example of a turbomachine comprising a fan capable f being obtained by a manufacturing method of a turbomachine fan according to an embodiment of the invention.

FIG. 3 shows an example of an aircraft turbomachine 10 comprising a fan 11 obtained by the implementation of the manufacturing method 100.

The turbomachine 10 comprises a nacelle 12 extending along a longitudinal axis 13 and within which are provided, from upstream to downstream in the gas flow direction, the fan 11, a low-pressure compressor 14, a high-pressure compressor 15, a combustion chamber, a high-pressure turbine, a low-pressure turbine and a gas exhaust nozzle, not shown.

The fan 11 is driven and supported by a disk 16 connected to a rotating shaft 17.

The fan 11 further comprises a plurality of blades 18 sequenced around the disk 16. In the scope of the invention, the blades 18 are sequenced in an optimal sequence ORD determined during the manufacturing method 100 of the fan 11 so that the noise level generated by the fan 11 is a minimum at multiple rotational frequencies, called FMR, of said fan 11, when the turbomachine 10 is in operation.

Figure 4B:
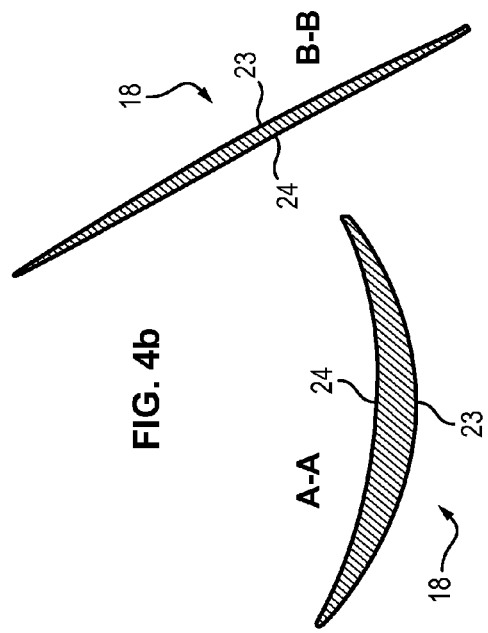
FIGS. 4a and 4b show respectively a side view of a blade, and cross-sectional views at different heights of said blade.
Figure 4A:
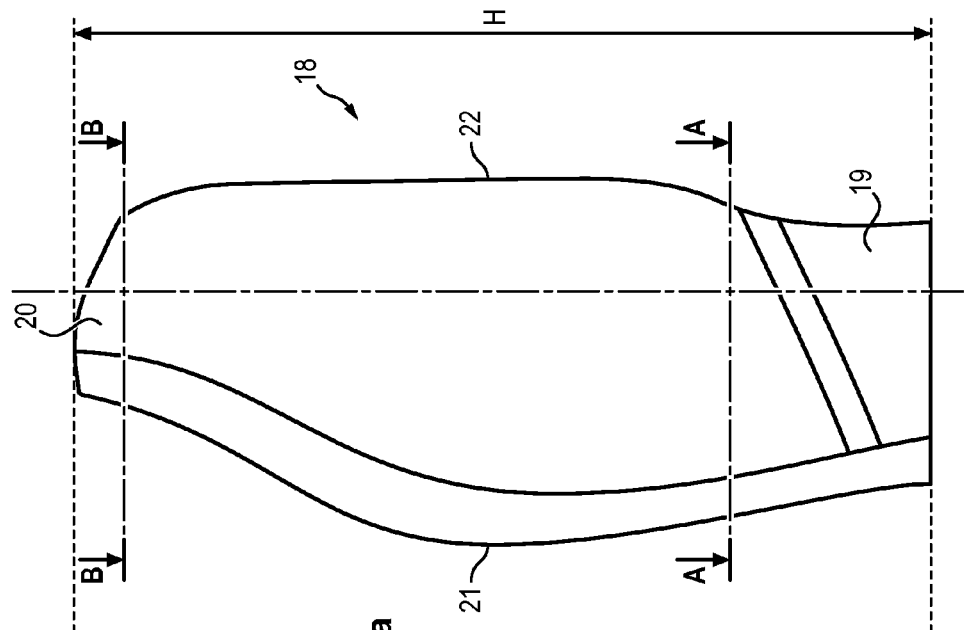

One example of a blade 18 is illustrated in FIGS. 4a and 4b. Seen in these figures is that the blade 18 has a blade root 19 corresponding to the end of the blade 18 supported by the disk 16 and a blade tip 20 corresponding to its opposite end, facing the nacelle 12 of the turbomachine 10. Also seen is that the blade 18 has, from upstream to downstream in the gas flow direction, a leading edge 21 and a trailing edge 22. Seen in particular in FIG. 4b is that the profile of the blade 18 has a camber defining, on the one hand, a generally convex face 23 called the "upper surface" and on the other hand a generally concave face 24 called the "lower surface".

The blade is composed of a plurality of sections which are "stacked" on one another according to a given stacking law. The stacking law can for example be a curve connecting all the centers of gravity of the different sections composing the blade.

An orthogonal coordinate system X, Y, Z is defined, in which the axis X is parallel with the longitudinal axis 13 of the turbomachine 10. The coordinate system X, Y, Z is for example direct and its origin is selected arbitrarily. For example, it is possible to have the origin of the coordinate system in the center of the bladed wheel.

The distance H between the upper end of the blade 18, at the blade tip 20, projected on the axis Z and the lower limit of the blade 18, above the disk 16 at the blade root 19, projected on the axis Z is called the "total height" of the blade 18.

The position of the center of gravity $G_s$ of a section of the blade 18 is defined, taken at a given cross-sectional height of the blade 18 (coordinate along the axis Z) by its coordinates $X_{Gs}$ and $Y_{Gs}$ in the coordinate system X, Y, Z, respectively along the axis X and the axis Y. The given cross-sectional height $h_c$ is typically defined as a percentage of the total height H of the blade 18 from the root 19 of said blade.

Figure 5A:
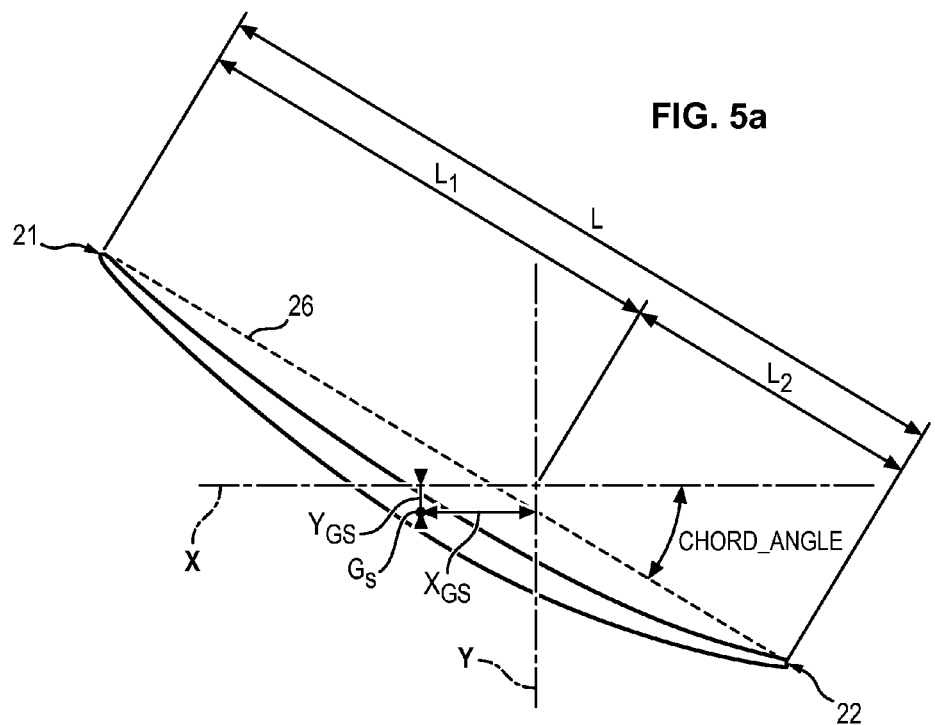
FIGS. 5a and 5b illustrate different structural parameters measurable on a blade.

The section of a straight line 26 shown in FIG. 5a, connecting the leading edge 21 and the trailing edge 22 of said blade 18 is called the "chord" of the blade 18. The chord 26 is for example defined by the parameter L corresponding to the total length of the chord 26, and/or by the parameter L1 corresponding to the length of the cord 26 from the leading edge 21 to the axis Z, and/or by the parameter L2 corresponding to the length of the chord 26 from Z to the trailing edge 22. The parameters L, L1 and L2 are illustrated in FIG. 4b. The parameters L, L1 and L2 are typically measured at a given cross-sectional height $h_c$ corresponding to a percentage of the total height H of the blade 18.

The angle CHORD_ANGLE between the chord 26 of the blade 18 and the axis X is called the "stagger angle". The parameter CHORD_ANGLE is illustrated in FIG. 5a. The parameter CHORD_ANGLE is typically measured at a given cross-sectional height $h_c$ corresponding to a percentage of the total height H of the blade.

Figure 5B:
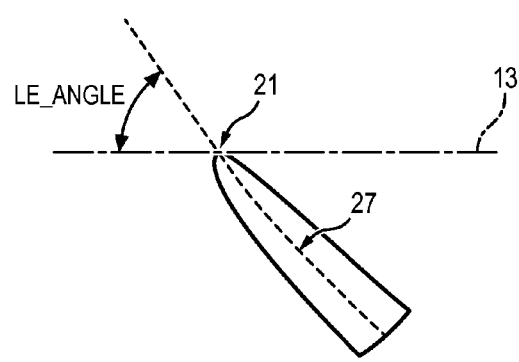
Figure 5B:
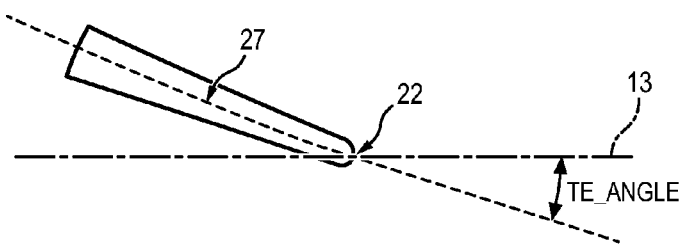

The angle LE_ANGLE as shown in FIG. 5b, between the longitudinal axis 13 of the turbomachine 10 and the skeleton curve 27 of the blade 18 at a point placed at a given distance from the leading edge 21 is called the "leading edge angle". The skeleton curve 27 is defined for each section of the blade 18 as the mean line of the profile of said blade 18. The parameter LE_ANGLE is typically measured at a given cross-sectional height $h_c$ corresponding to a percentage of the total height H of the blade 18. The parameter LE_ANGLE is illustrated in FIG. 5a.

The angle TE_ANGLE between the longitudinal axis 13 of the turbomachine 10 and the skeleton curve 27 of the blade 18 at a point placed at a given distance from the trailing edge 22 is called the "trailing edge angle". The parameter TE_ANGLE is typically measured at a given cross-sectional height $h_c$ corresponding to a percentage of the total height H of the blade 18. The parameter TE_ANGLE is illustrated in FIG. 5b.

The distance between the lower surface 24 and the upper surface 23 of said blade 18 is called the "thickness" of the profile of the blade 18. The thickness of the profile of the blade 18 is for example defined by the thickness EA of the profile of the blade 18 at a given distance from its leading edge 21, and/or by the thickness EF of the profile of the blade 18 at a given distance from its trailing edge, and or by the maximum thickness EMAX of the profile of the blade. The parameters EA, EF and EMAX are typically measured at a given cross-sectional height $h_c$ corresponding to a percentage of the total height H of the blade.

Figure 8B:
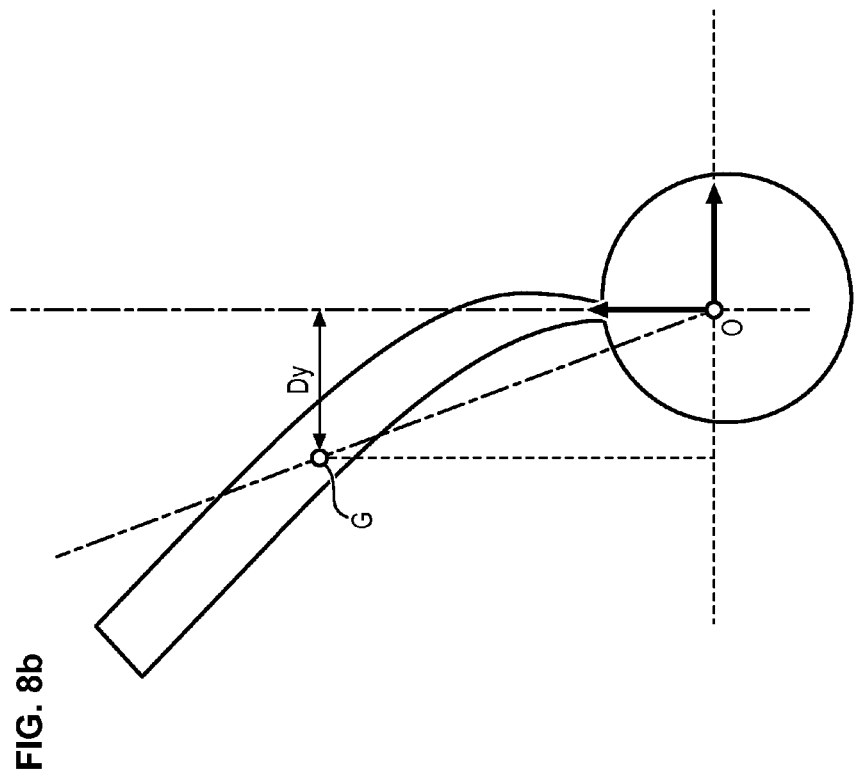
FIGS. 8a and 8b illustrate different structural parameters measurable on a blade, respectively in a side view and a view from behind the blade.
Figure 8A:
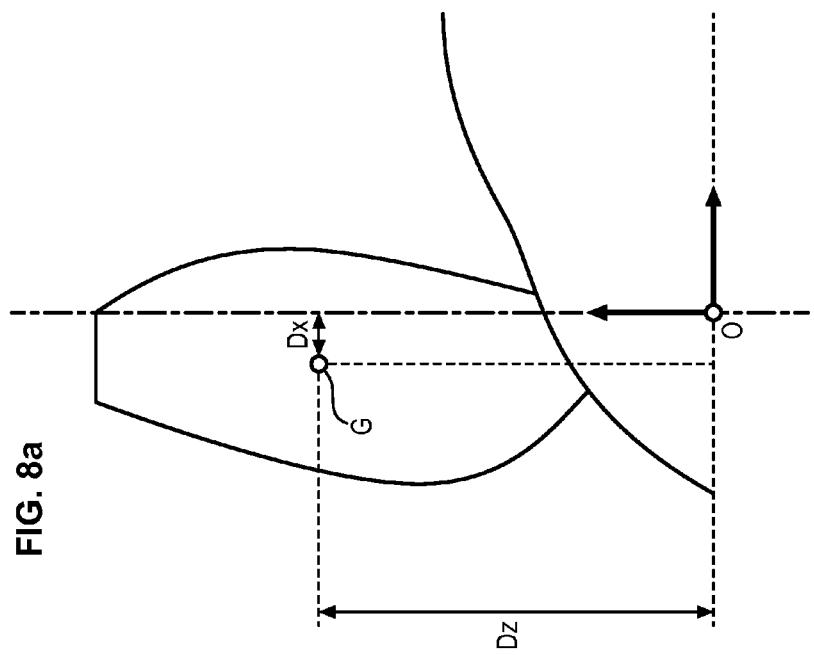

The product of the mass of the blade 18 and the coordinate Dz of the center of gravity G of the blade 18 along the axis Z is called the "radial static moment R". The center of gravity and the coordinate Dz are illustrated in FIG. 8a.

The product of the mass of the blade 18 and the coordinate Dy of the center of gravity G of the blade 18 along the axis Y is called the "tangential static moment T". The center of gravity and the coordinate Dy are illustrated in FIG. 8b.

The product of the mass of the blade 18 and the coordinate Dx of the center of gravity G of the blade 18 along the axis X is called the "axial static moment A". The center of gravity and the coordinate Dx are illustrated in FIG. 8a.

Figure 7:
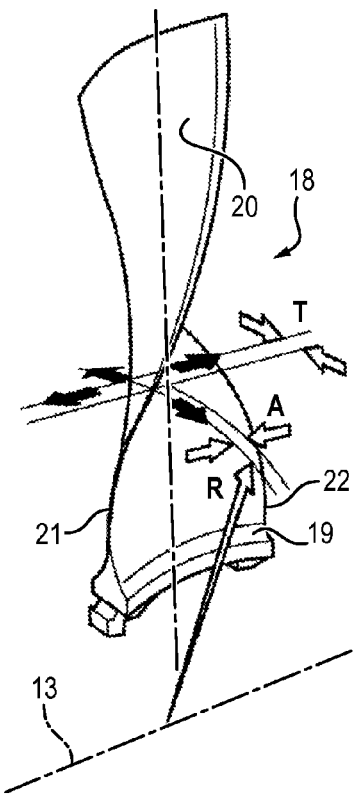
FIG. 7 illustrates different structural parameters measurable on a blade.

The radial R, tangential T and axial A static moments are illustrated in FIG. 7.

Figure 6:
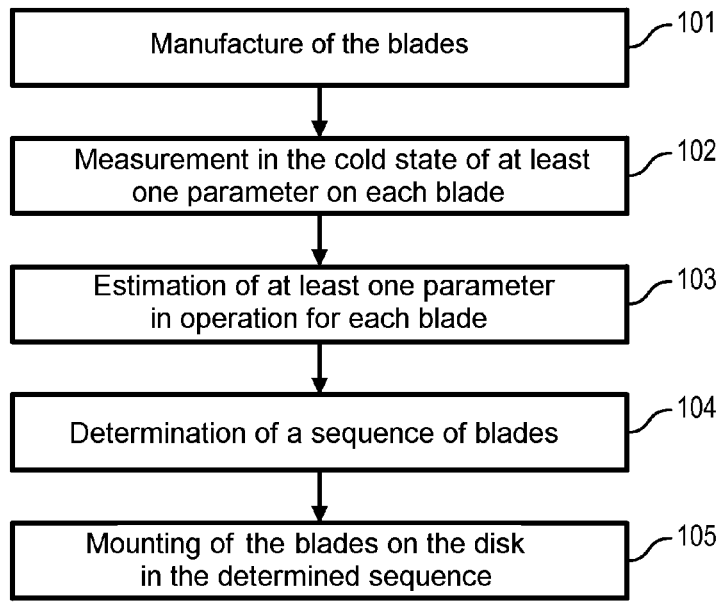
FIG. 6 shows the manufacturing method of a turbomachine fan according to an embodiment of the invention.

FIG. 6 shows a manufacturing method 100 of a fan 11 of a turbomachine 10. The method 100 comprises the following steps:

manufacture 101 of the plurality of blades 18 intended to be mounted on the disk 16, measurement, in the cold state 102 of at least one structural parameter on each of the blades 18, and for each of the blades 18, estimating 103 at least one structural parameter in operation relating to a blade 18 from the structural parameter(s) measured in the cold state on said blade 18, determining 104 the optimal sequence of the blades 18 around the disk 16 from the structural parameters estimated in operation for each of the blades, so as to reduce the noise level at FMR frequencies of the fan 11, and mounting 105 blades 18 on the disk 16 in to the optimal sequence ORD thus determined.

What is meant by "structural parameter measured in the cold state" is the structural parameter measured on a blade 18 after manufacture 101 of said blade 18 and before it is mounted 105 on the disk 16. The structural parameters measured in the cold state on each blade 18 are for example:

the position of the center of gravity $X_{Gs}$, $Y_{Gs}$ of a section of the blade 18 at a given cross-sectional height $h_c$, and/or the length of the chord 26 of the blade (parameter L and/or parameter L1 and/or parameter L2) at a given cross-sectional height $h_c$, and/or the stagger angle CHORD_ANGLE of the blade 18 at a given cross-sectional height $h_c$, and/or the leading edge angle LE_ANGLE of the blade 18 at a given cross-sectional height $h_c$, and/or the trailing edge angle TE_ANGLE of the blade 18 at a given cross-sectional height $h_c$, and/or the total height H of the blade 18, and/or the radial R and/or axial A and/or tangential T static moments of the blade 18, illustrated in FIG. 7, and/or the mass of the blade 18.

The structural parameters measured in the cold state on each blade 18 are preferably:
- the position of the center of gravity $X_{Gs}$, $Y_{Gs}$ of a section of the blade 18 at a given cross-sectional height $h_c$, and/or
- the stagger angle CHORD_ANGLE of the blade 18 at a given cross-sectional height $h_c$, and/or
- the leading edge angle LE_ANGLE of the blade 18 at a given cross-sectional height $h_c$, and/or
- the trailing edge angle TE_ANGLE of the blade 18 at a given cross-sectional height $h_c$.

The different structural parameters can be measured in the cold state at given cross-sectional heights $h_c$ of the blade 18 that are different or equal. It is for example possible to measure the stagger angle CHORD_ANGLE at 90% of the total height H of the blade 18 and the coordinate $Y_G$ of the center of gravity of a section of the blade 18 at 95% of the total height H of the blade 18.

What is meant by "structural parameter estimated in operation" is the estimated structural parameter of a blade 18, when said blade 18 is mounted on the disk 16 and the turbomachine 10 is in operation. The turbomachine 10 is in operation when the disk 16 on which the blades 18 were previously mounted is driven in rotation by the rotating shaft 17 around the longitudinal axis 13. The blades 18 are therefore in rotation and are loaded aerodynamically.

The structural parameters estimated in operation for each of the blades 18 are for example:
- the position of the center of gravity $X_{Gs}$, $Y_{Gs}$ of a section of the blade 18 at a given cross-sectional height $h_c$, and/or
- the length of the chord 26 of the blade 18 (parameter L and/or parameter L1 and/or parameter L2) at a given cross-sectional height $h_c$, and/or
- the stagger angle CHORD_ANGLE of the blade 18 at a given cross-sectional height $h_c$, and/or
- the leading edge angle LE_ANGLE of the blade 18 at a given cross-sectional height $h_c$, and/or
- the trailing edge angle TE_ANGLE of the blade 18 at a given cross-sectional height $h_c$, and/or
- the total height H of the blade 18, and/or
- the radial R and/or axial A and/or tangential T static moments of the blade 18, and/or
- the mass of the blade 18.

The structural parameters estimated in operation for each of the blades 18 are preferably:
- the stagger angle CHORD_ANGLE of the blade 18 at a given cross-sectional height $h_c$, and/or
- the leading edge angle LE_ANGLE of the blade 18 at a given cross-sectional height $h_c$, and/or
- the trailing edge angle TE_ANGLE of the blade 18 at a given cross-sectional height $h_c$.

The steps of measuring 102 in the cold state structural parameters of the blades 18 and estimation 103 of the structural parameters in operation of the blades 18 can occur one after the other or simultaneously for each blade 18.

During the estimation step 103, the structural parameter(s) measured in the cold state on a blade 18 and the structural parameter(s) estimated in operation of said blade 18 can be of the same type or of different types. In other words, it is for example possible that the structural parameter measured in the cold state on one blade 18 is the stagger angle CHORD_ANGLE and that the structural parameter estimated in operation of said blade 18 is also the stagger angle CHORD_ANGLE. It is also possible that the structural parameter measured in the cold state on a blade 18 is the mass of said blade 18 and that the structural parameter estimated in operation of said blade 18 is the stagger angle CHORD_ANGLE.

According to a preferred embodiment of the invention, the estimation 103 in operation of the structural parameter(s) of a blade 18 is performed from the structural parameter(s) measured in the cold state on said blade 18 and from a predictive response surface previously generated by the surface response method (MSR). The structural parameter(s) in operation are estimated for a given engine speed. Preferably, the given engine speed corresponds to the engine speed in which the fan 11 is likely to emit the highest FMR noise level, when the fan 11 is mounted in the turbomachine 10. This given engine speed depends on the engine considered.

The surface response method is a statistical method well-known to a person skilled in the art. This method allows exploration of the relations between the different variable involved in an experiment. The surface response method also generally involves an experiment plan, that is a sequenced series of tests of an experimentation based on the control of one or more input parameters for the purpose of obtaining a result. Within the scope of the invention, the experiment plan preferably involves numerical calculations (numerical simulation). The experiment plan can also involve tests on blades. From the input parameters and the results obtained, it is then possible, by implementing the surface response method, to generate a predictive response surface. This predictive response surface allows estimating one or more output data from one or more input data. It will be understood that in the scope of the invention the predictive response surface allows, from structural parameters measured in the cold state on the blade 18, estimating the structural parameters in operation of said blade 18, for a given engine speed. The response surface method applied to the experiment plan is for example describe in the document R. Myers, D. Montgomery, "Response Surface Methodology, Process and Product Optimization Using Designed Experiments," Wiley, 1995.

The predictive response surface can also be validated by measurements on a fan test bed.

In particular, measurements by Tip Timing can for example be carried out to measure the stagger angle CHORD_ANGLE in operation, particularly at the blade tip 20. The Tip Timing measurements allow for example the detection in real time of the passage of the leading edge 21 and of the trailing edge 22 at the blade tip 20, of each of the blades 18, so as to determine experimentally the stagger angle CHORD_ANGLE of each of the blades 18, this for different engine speeds N of the turbomachine 10.

The use of such a predictive response surface allows for example obtaining an accuracy of 0.02° insofar as the stagger angle CHORD_ANGLE is concerned. This accuracy can then be validated by the aforementioned tip timing measurements.

The determination step 104 of the optimal sequence of the blades 18 around the disk 16 is for example accomplished by numerical calculations, particularly by numerical simulation. These numerical calculations can also take into account mechanical balancing criteria, such as the suppression of an imbalance in the fan 11. In is also possible to use any discrete optimization algorithm such as tabu search, oriented annealing, genetic algorithms or the ant colony algorithm. All these algorithms are known from the prior art.

The manufacturing method 100 has the advantage of determining the optimal sequence of the blades 18 from structural parameters in operation of the blades 18, and thus to take into account the behavior of each of the blades 18 which can vary from one blade 18 to another, when the turbomachine 10 is in operation. The optimal sequence thus determined therefore more effectively reduces the noise level of the fan 11 at FMR frequencies.

The manufacturing method 100 also has the advantage of reducing the vibrations of the fan 11 which are due to mechanical and/or aerodynamic imbalance created by the geometric differences between the blades 18.

The invention claimed is:

1. A method for manufacturing a turbomachine fan including a plurality of blades mounted on a disk extending around a longitudinal axis, said method comprising:
    measuring in a cold state, when said turbomachine fan is in a non-operational state, at least one structural parameter on each of the plurality of blades,
        for each of the plurality of blades, estimating at least one structural parameter relating to each said blade when said turbomachine is in an operational state from the at least one measured structural parameter for each said blade,
    determining an optimal sequence (ORD) of the plurality of blades around the disk from the at least one estimated structural parameter obtained for each of the plurality of blades,
    mounting the plurality of blades on the disk in the optimal sequence (ORD) thus determined,
wherein when said turbomachine fan is in said operational state, a reduced noise level at multiple rotational frequencies (FMR) is obtained as compared to a noise level that would be produced by a turbomachine fan in which the plurality of blades are mounted in a sequence determined based on said at least one measured structural parameter on each of the plurality of blades.

2. The method according to claim 1, wherein the estimation in operation of the at least one structural parameter of each said blade is performed from the structural parameter(s) measured in the cold state on each said blade and from a predictive response surface previously generated by a response surface method (RSM) to which are applied the at least one structural parameter measured in the cold state of each said blade.

3. The method according to claim 1, wherein the at least one structural parameter measured in the cold state on each said blade are selected from at least one of:
    a position of the center of gravity ($X_{Gs}$, $Y_{Gs}$) of a section of each said blade at a cross-sectional height ($h_c$) of each said blade, and
    a stagger angle (CHORD_ANGLE) of each said blade at the cross-sectional height ($h_c$) of each said blade, and
    a leading edge angle (LE_ANGLE) of each said blade at the cross-sectional height ($h_c$) of each said blade, and
    a trailing edge angle (TE_ANGLE) of each said blade at the cross-sectional height ($h_c$) of each said blade.

4. The method according to claim 1, wherein the at least one structural parameter measured in the cold state on each said blade is selected from at least one of:
    a position of the center of gravity ($X_{Gs}$, $Y_{Gs}$) of a section of each said blade at a cross-sectional height ($h_c$) of each said blade, and
    a length (L, L1, L2) of the chord of each said blade at the cross-sectional height ($h_c$) of each said blade, and
    a stagger angle (CHORD_ANGLE) of each said blade at the cross-sectional height ($h_c$) of each said blade, and
    a leading edge angle (LE_ANGLE) of each said blade at the cross-sectional height ($h_c$) of each said blade, and
    a trailing edge angle (TE_ANGLE) of each said blade at the cross-sectional height ($h_c$) of each said blade, and
    a total height (H) of each said blade, and
    at least one of a radial (R), an (A) and a tangential (T) static moment of each said blade, and
    a mass of each said blade.

5. The method according to claim 1, wherein the at least one structural parameter estimated in operation of each said blade is selected from at least one of:
    a stagger angle (CHORD_ANGLE) of each said blade at a cross-sectional height ($h_c$) of each said blade, and
    a leading edge angle (LE_ANGLE) of each said blade at the cross-sectional height ($h_c$) of each said blade, and
    a trailing edge angle (TE_ANGLE) of each said blade at the cross-sectional height ($h_c$) of each said blade.

6. The method according to claim 1, wherein the at least one structural parameter estimated in operation of each said blade are selected from at least one of:
    a position of the center of gravity ($X_{Gs}$, $Y_{Gs}$) of a section of each said blade at a cross-sectional height ($h_c$) of each said blade, and
    a length (L, L1, L2) of the chord of each said blade at the cross-sectional height ($h_c$) of each said blade, and
    a stagger angle (CHORD_ANGLE) of each said blade at the cross-sectional height ($h_c$) of each said blade, and
    a leading edge angle (LE_ANGLE) of each said blade at the cross-sectional height ($h_c$) of each said blade, and
    a trailing edge angle (TE_ANGLE) of each said blade at the cross-sectional height ($h_c$) of each said blade, and
    a total height (H) of each said blade, and
    at least one of a radial (R), an xial (A) and a tangential (T) static moment of each said blade, and
    a mass of each said blade.

7. The method according to claim 3, wherein the cross-sectional height ($h_c$) is taken as 90% of a total height (H) of each said blade from a root of each said blade.

8. A turbomachine fan obtained by the implementation of the manufacturing method according to claim 1.

9. A turbomachine comprising the fan according to claim 8.

* * * * *